Dec. 17, 1946.                  B. SVIRSKY                  2,412,760
                      WATER CONTROL FOR TOILET TANKS
                          Filed June 26, 1944
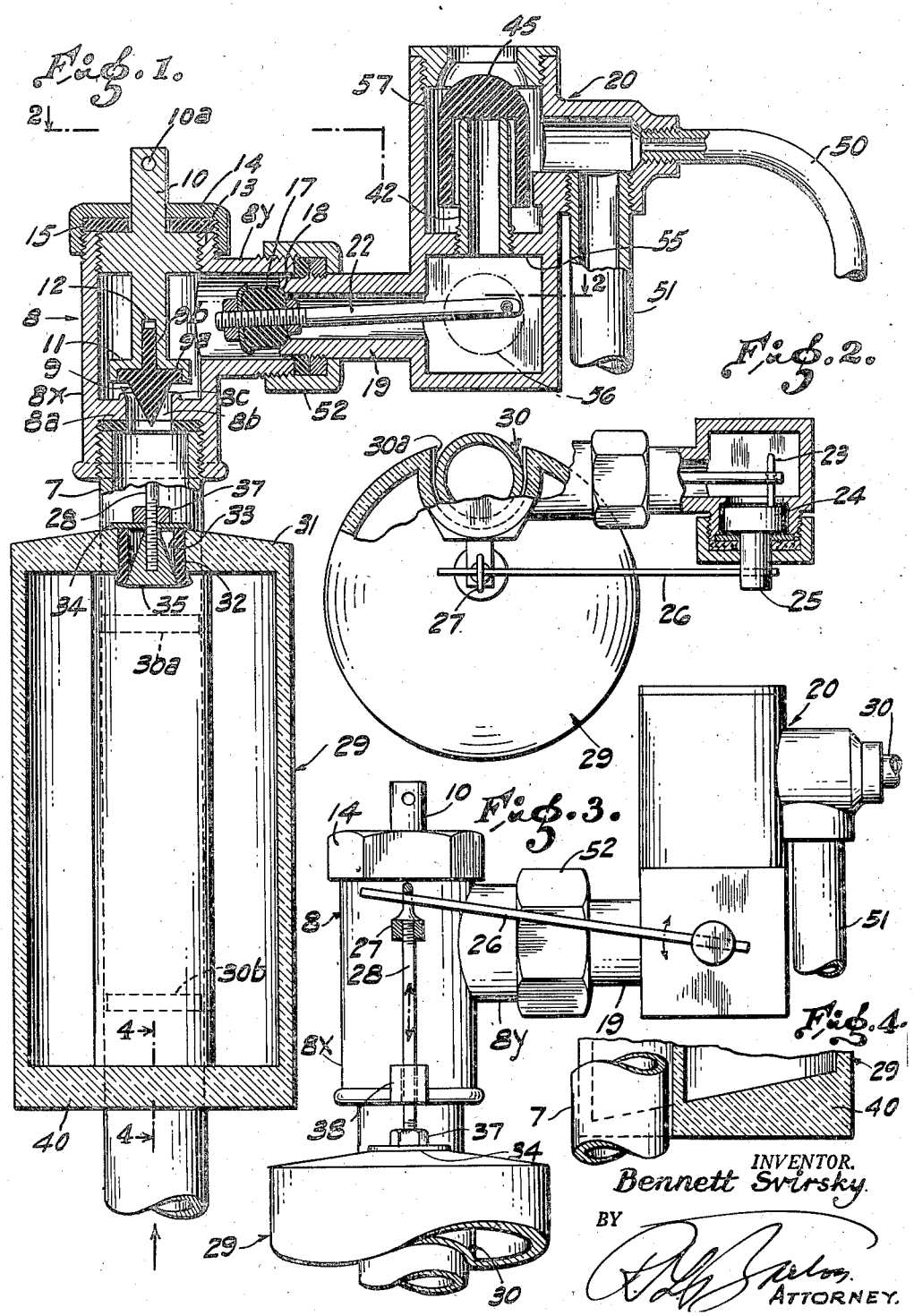
INVENTOR.
Bennett Svirsky.
BY
ATTORNEY.

Patented Dec. 17, 1946

2,412,760

UNITED STATES PATENT OFFICE 2,412,760

WATER CONTROL FOR TOILET TANKS

Bennett Svirsky, Glendale, Calif., assignor to Research Developing Associates, Inc., Holyoke, Mass.

Application June 26, 1944, Serial No. 542,080

7 Claims. (Cl. 137—104)

This invention relates to a water control for toilet tanks.

Speaking more specifically, the present invention relates to an improvement upon the water control for toilet tanks described in my copending application bearing the same title, filed March 13, 1944; S. N. 526,255.

Among the objects of the present invention are: to provide a more compact arrangement, in relation to adjacent structure, of the float or buoyant means whereby the action of the valve for the intake valve is operated; to provide improved gravity controlled means for insuring that the float will rise and fall in a smooth, even manner with a minimum of friction being produced in its mounting means; to provide superior demountability of parts with a view to replacement and repair; and also to improve various details of structure including provision of a superior float rod.

Other objects, advantages and features of invention will hereinafter appear.

Referring to the accompanying drawing, which illustrates what is at present deemed to be a preferred embodiment of the invention, Fig. 1 is a vertical mid section of the complete device.

Fig. 2 is a transverse section, the plane of section being for the most part indicated by angular line 2—2 on Fig. 1, a portion of the float and inlet pipe being sectioned at a lower level.

Fig. 3 is a side elevation of the complete structure except that the lower portion of the float and inlet pipe are broken away in order to contract the view.

Fig. 4 is a fragmental sectional detail of the lower portion of the float, a fragment of the inlet pipe being included in the view. The float is sectioned on the plane indicated by line 4—4 on Fig. 1.

Referring in detail to the drawing, the upstanding supply pipe 7 has screwed upon its upper end an L-shaped fitting 8 furnished in its lower arm 8x with a cross-wall 8a having through it a port 8b provided with a circular valve seat-forming lip 8c around its upper end. With said seat cooperates a frusto-conical valve 9 positioned with its apex directed downwardly. Said valve is made of a rubber or rubber like material and has around its base a seat-engaging flange 9a and also has an upwardly projecting axial stem 9b.

Said valve 9 is mounted upon the lower end of a stem 10 the lower end of which carries a shallow inverted cup 11 which tightly surrounds the flanged portion of the valve 9, said stem also having an axial bore 12 in its lower end within which is tightly fitted the aforesaid valve stem 9b.

In axial alinement with its lower arm the fitting 8 is furnished with an upwardly directed annular extension 13 which is screwthreaded both internally and externally, the stem 10 having a screwthreaded portion within said extension, and a cap 14 being screwed thereonto, said cap being apertured to provide for the extension of the stem 10 through it and having within it a gasket 15 to insure a fluid tight fit around said stem.

The valve 9 takes the place of the conventional shut-off valve, which is ordinarily located below the toilet tank. The stem 10 which carries said valve 9 has a hole 10a through its upper end portion to receive a suitable tool for rotation of the stem in adjusting it so as to maintain the valve open to the desired extent.

The float controlled intake valve 17 cooperates with a seat 18 formed upon an adjacent end of a short tube 19 which, together with the horizontal arm 8y of the fitting 8, may be regarded as forming a part of a lateral extension carried by the upper end of the supply pipe 7, this extension including a housing 20 with which said tube 19 communicates. It is unnecessary to describe in every detail the parts now being mentioned as they are similar to those disclosed in my aforesaid copending application, for performing the same functions. They include a valve operating rod 22 one end of which is pivoted to a pin 23 carried eccentrically by a head 24 which is formed upon a stub shaft 25 turnably mounted in and extending through a side portion of the housing 20. Said shaft is rocked by the float operated arm 26 the otherwise free end portion of which passes through an eyepiece 27 screwing onto the upper end of a pin 28 that upstands from the tubular or cylindrical float 29. Said float, preferably constructed of glass, is shaped as a tube having closed ends and a vertical guide groove 30 along one of its sides, which fits partly around the supply pipe 7. Said float has an upper end wall 31 through which is a circular hole 32 which is offset from the axis of the float toward the aforesaid groove 30. Within said hole 32 is fitted an elastic sleeve 33 which is longer than the hole. Against the upper end of this sleeve abuts a centrally apertured disk 34 through which passes the screwthreaded lower end portion of the aforesaid pin 28, there being secured to said pin below said disk a conical follower 35 which the length of should be at least about equal to that of said sleeve, the diameter of the lower end of said follower being of less diameter than the hole 32 in the float, but materially greater in diameter than the interior diameter of the sleeve when the latter is in an unstressed condition. When the parts that are now being described are assembled a nut 37 is at first screwed well back upon the screwthreaded part of the pin 28 before the disk 34, sleeve 33 and follower 35 are attached. Not until after the sleeve and follower have been inserted into the hole 32 is the nut screwed down as shown in Fig. 1 to expand the sleeve and thereby seal the hole 32 watertight.

The lower arm 8x of the fitting 8 is shown carrying a guide lug 38 at its lower end, this lug having through it a vertical bore which receives the aforesaid pin 28 with a working fit, this bore being long enough to cooperate with the pin 28 to guard against the float being tilted out of its operative relation to the supply pipe 7 along which the grooved part of the float slides during rise and fall of the water level in the tank. As an additional means for stabilizing the movements of the float the float is furnished with a bottom wall 40 which is thickened at that side of the float which is farthest from the pipe 7, thus tending to cause the lower end of the float to gravitate toward said pipe.

In order to reduce friction between the grooved portion of the float and the supply pipe 7 an arcuate rib 30a is formed within the upper part of the float groove 30 and a like rib 30b in the lower part of said groove slightly to space the remaining portion of the groove away from the supply pipe 7.

The remaining parts contained within or supported by the housing 20, including the tube 42, anti-syphoning valve 45 supported thereon, refill tube 50, hush tube 51 and union nut 52, have already been described in my aforesaid copending application. It only remains, therefore, to point out here that in the present disclosure the housing structure has been simplified, there being provided in place of a two-part housing, a single housing 20 furnished with a cross-wall 55 which supports the tube 42 and separates a chamber 56 which contains the turnable head 24 from the chamber 57 which contains the anti-syphoning valve 45.

What is claimed is:

1. The combination, with the upstanding supply pipe of a toilet tank; of a tubular float having along one side a groove within which at least a portion of the circumference and length of said pipe is contained with a loose fit, and a valve operatively related to said float to control the flow of water through the supply pipe, there being arcuate spacing ribs on upper and lower portions of the grooved part of the float positioned to reduce the friction thereof against said pipe, said float having a bottom wall which increases in thickness toward the side thereof which is farthest from said pipe to cause the lower end of the float to gravitate into continuous contact with said pipe.

2. The combination, with the upstanding supply pipe of a toilet tank; of a tubular float having along one side a groove within which at least a portion of the circumference and length of said pipe is contained with a loose fit, a valve to control the flow of water through the supply pipe, and means operatively relating the upper end portion of said float to said valve, said means preventing the upper portion of said float from receding from said pipe, said float having a bottom wall which increases in thickness toward the side thereof which is farthest from said pipe to cause the lower end of the float to gravitate into continuous contact with said pipe.

3. The combination, with the upstanding supply pipe of a toilet tank; of a tubular float having along one side a groove within which at least a portion of the circumference and length of said pipe is contained with a loose fit, said pipe having a tubular lateral extension through which water is discharged, and valvular means to control the flow of water through said extension, said valvular means including a swingably mounted operating rod so constructed and arranged to be restricted to movement in a vertical plane and having an otherwise free end portion operatively connected with the upper end portion of said float so that such portion of the float is prevented from receding from said pipe as the float rises and falls, said float having a bottom wall which increases in thickness toward the side thereof which is farthest from said pipe thereby to cause the lower end of said float to gravitate into continuous contact with said pipe.

4. In a device of the kind described, an upstanding supply pipe for a toilet tank, a fitting attached to the otherwise open top end of said pipe, a valve to control the outflow of water through said fitting and the supply pipe, a tubular float to operate said valve, said float having a grooved side portion which contains at least a portion of the circumference of said supply pipe and is slidably related to it, and an upstanding guide rod for said float, said fitting having an apertured lateral extension through which said rod passes with a working fit, said float having a bottom wall which increases in thickness toward the side thereof which is farthest from said pipe to cause the lower end of the float to gravitate into continuous contact with said pipe.

5. The combination, with the upstanding supply pipe of a toilet tank; of a tubular float having along one side a groove within which at least a portion of the circumference and length of said pipe is contained with a loose fit, a valve to control the flow of water through the supply pipe, and means operatively relating the upper end portion of said float to said valve, said float having a bottom wall which increases in thickness toward the side thereof which is farthest from said pipe to cause the lower end of the float to gravitate into continuous contact with said pipe.

6. A tubular float having along one side a groove, and a bottom wall which increases in thickness toward the side thereof which is farthest from said groove.

7. A tubular float having along one side a groove, and a bottom wall which increases in thickness toward the side thereof which is farthest from said groove, and arcuate spacing ribs on upper and lower portions of the grooved part of said float.

BENNETT SVIRSKY.